United States Patent [19]

Fullard

[11] Patent Number: 5,020,209
[45] Date of Patent: Jun. 4, 1991

[54] BELT LACING AND CUTTER ASSEMBLY

[75] Inventor: Brian W. Fullard, Naperville, Ill.; Thomas J. Bubula, Beeher, Ill.

[73] Assignee: Flexible Steel Lacing Company, Downers Grove, Ill.

[21] Appl. No.: 432,196

[22] Filed: Nov. 6, 1989

[51] Int. Cl.$^5$ ............................................. B23P 11/00
[52] U.S. Cl. ................................. 29/564.8; 29/243.51
[58] Field of Search .................. 29/243.51, 564, 564.7, 29/564.8, 558; 227/21, 76, 111, 152

[56] References Cited

U.S. PATENT DOCUMENTS

| | | | |
|---|---|---|---|
| 1,740,180 | 12/1929 | Larson | 29/243.51 |
| 1,853,928 | 4/1932 | Purple | 29/243.51 |
| 2,899,680 | 8/1959 | Potter | 29/243.51 |
| 2,908,008 | 10/1959 | Potter | 29/243.51 |
| 3,044,074 | 7/1962 | Tebb et al. | 29/243.51 |
| 4,694,958 | 9/1987 | Musil | 206/340 |

FOREIGN PATENT DOCUMENTS 933733  9/1973  Canada ........................ 29/243.51

Primary Examiner—Z. R. Bilinsky
Attorney, Agent, or Firm—Fitch, Even, Tabin & Flannery

[57] ABSTRACT

An apparatus is disclosed for cutting an end of a belt and for clinching belt fasteners to the cut belt end. The apparatus includes a clamp for clamping the belt and a knife carriage driven across the belt to cut the belt end with a knife on the carriage. A line of belt fasteners mounted in a comb are then pressed against the belt by a roller which is mounted on a roller carriage for travel across the line of belt fasteners. Preferably, a single, detachable, manual driver or handle is used to drive the knife carriage and the roller carriage.

20 Claims, 8 Drawing Sheets

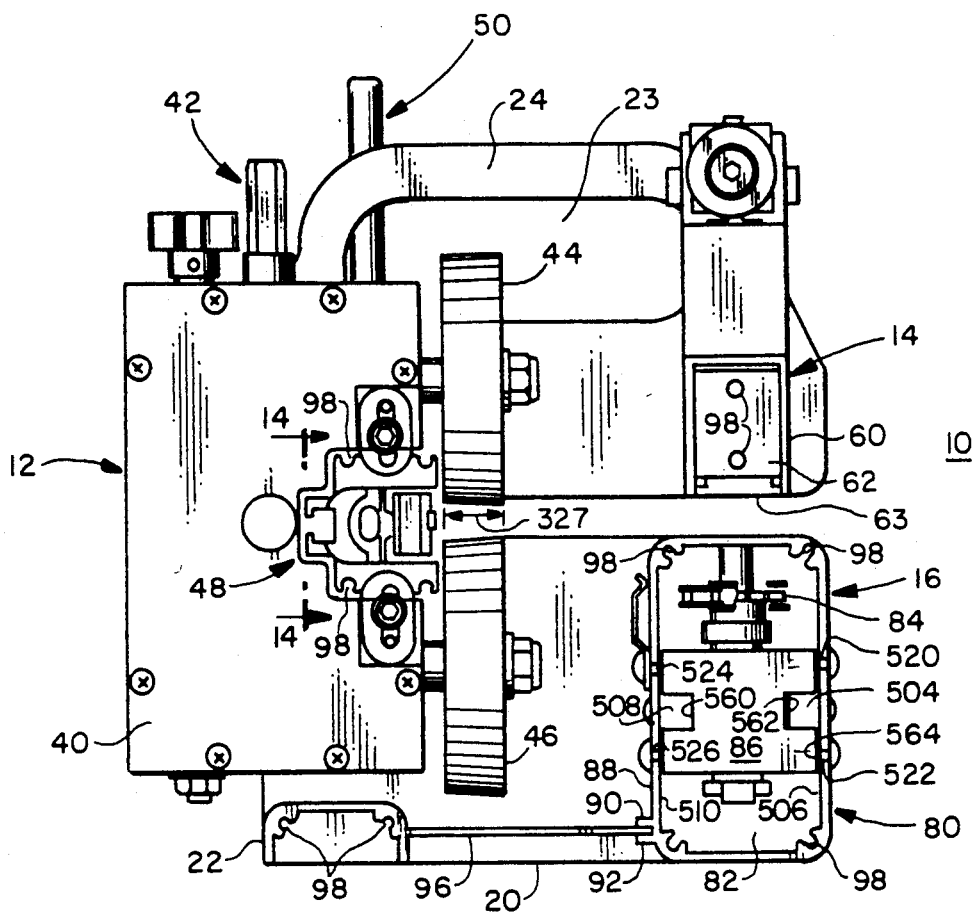
FIG. 3
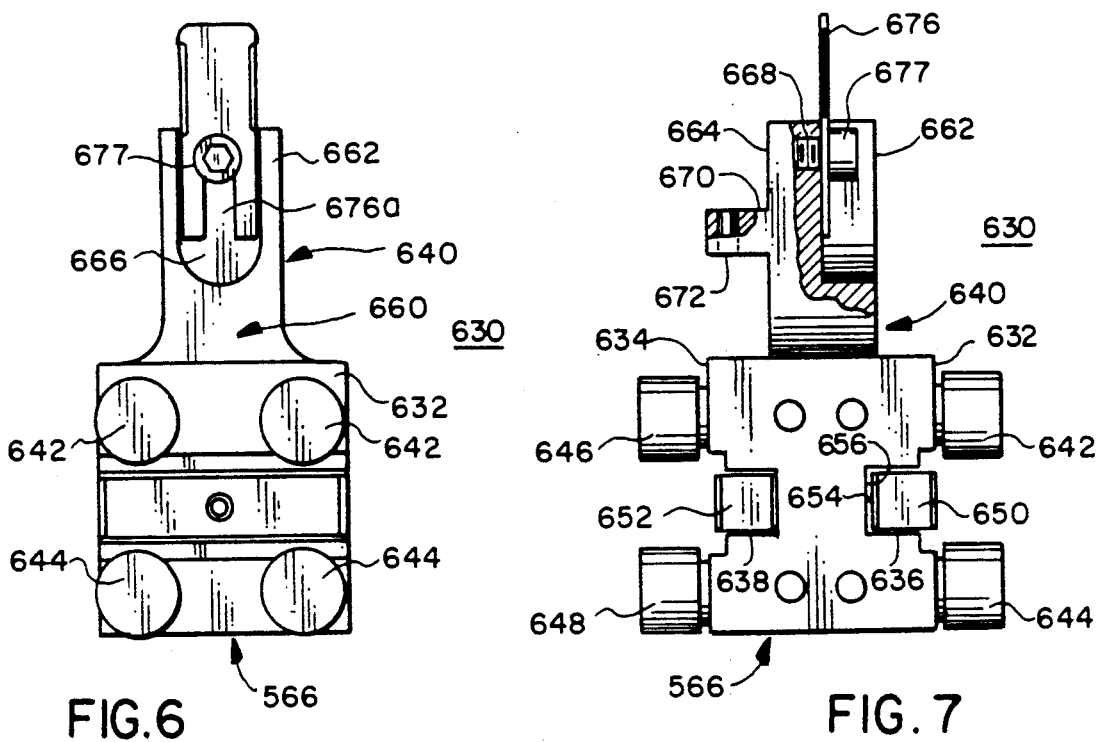
FIG. 6
FIG. 7

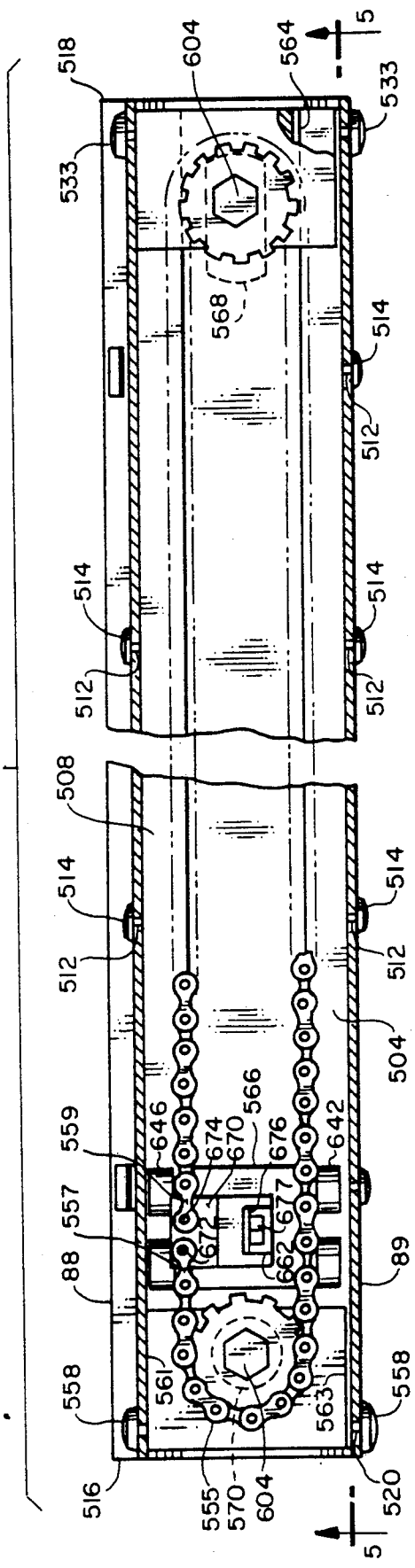
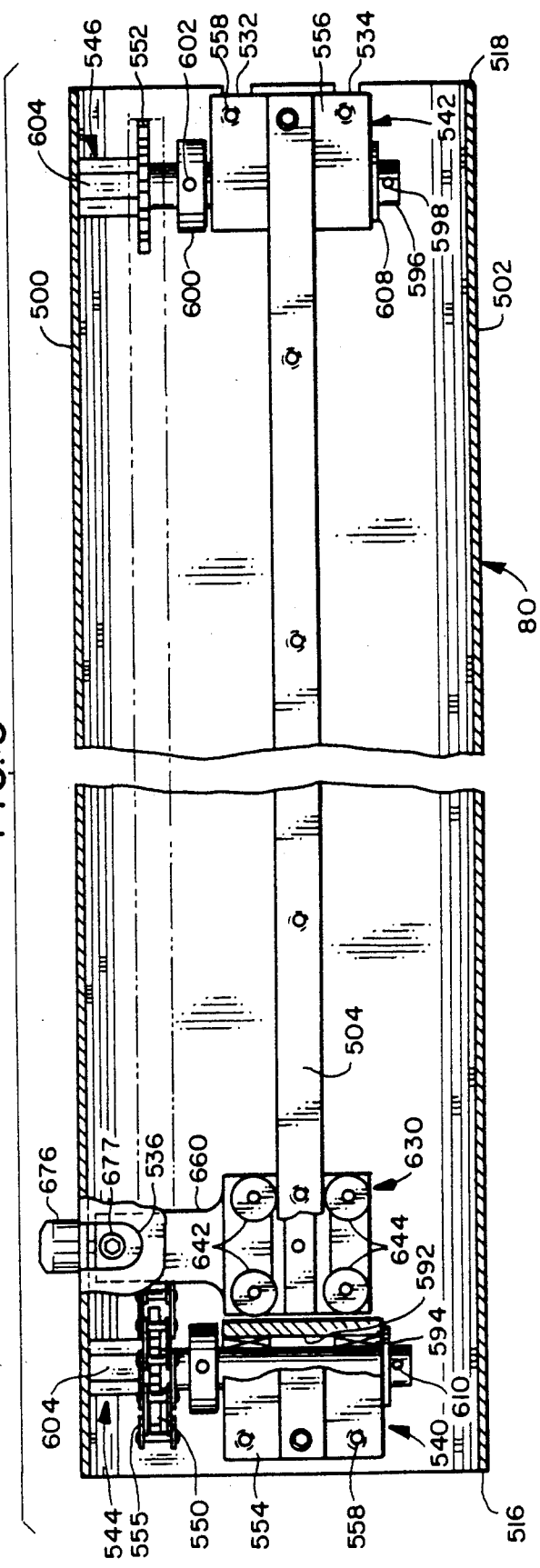
FIG. 4
FIG. 5

BELT LACING AND CUTTER ASSEMBLY

BACKGROUND OF THE INVENTION

The present invention relates to belt-lacing machines for clinching hook or C-shaped belt fasteners to a belt end.

Lacing machines to secure hook belt fasteners, such as shown in U.S. Pat. No. 4,694,958, to the end of a belt have been known and utilized for many years. These machines include manual lacers, that is hand operated, with multiple anvil arrangements, as well as hydraulically operable lacers. The multiple-anvil, press-type lacing machines require movement of the belt through the lacing machine or movement of the lacing machine along the length of a belt to secure the belt fasteners. The multiple-anvil lacing machines are frequently bulky and heavy, and consequently they are not readily portable for use in awkward, remote or hard-to-negotiate sites.

Belt lacing machines of the multiple-anvil type are illustrated by the apparatus shown in U.S. Pat. No. 3,044,074-Tebb et al., wherein a multiple anvil apparatus is coupled to a hydraulic operator. This structure, either with or without the hydraulic operator, is a cumbersome and bulky apparatus, which is not readily portable to a remote site for repair and maintenance of a belt. Other multiple-anvil type apparatus utilize a single anvil. However, they require indexing of the anvil apparatus along the belt end for clinching of the individual fasteners to this belt end. This single-indexing operation is slow, cumbersome and wearying to the operator, as it may encompass the actuation of a dual-handle apparatus for the clinching of each fastener.

Earlier belt lacing machines similarly applied a single fastener to a belt end with each stroke of the machine.

Indicative of this type of apparatus is the structure disclosed and taught in U.S. Pat. No. 1,740,180-Larsen, wherein a sleeve of hooks or fasteners may be applied to a belt end by a machine that is operable by a crank and lever apparatus. However, this early structure is not readily portable for usage in a confined environment, and does not lend itself to rapid application of fasteners to a wide belt.

Belt lacing machines are frequently lighter, more compact and more easily operable apparatus than the stand-alone belt-fastener devices with larger bases and frames. A known belt lacer utilizes a pair of rollers that are operable along a secured belt end, which belt end is maintained in this position during the application of belt fasteners thereto. Belt fasteners may be of the stamped metal plate kind of open-jaw, C-shaped fasteners or may be wire, open-jaw, C-shaped fasteners each of which has opposed pointed jaw ends, which are pressed into the conveyor belt end to form a U-shaped clamp with an eyelet to receive a coupling hinge pin for mating with similar fasteners on the opposite end of the conveyor belt and for subsequent coupling by a hinge pin inserted through the mated eyelets. In the belt-lacing machines, the lacing rollers are held in a roller-head assembly and the gap distance or separation between the roller circumference is adjustable to provide for variations in belt thickness, and more importantly, to provide the user with the opportunity to control the depth to which the pointed ends of the fasteners are pressed into the belt. That is, several roller passes or strokes may be used to sink the pointed ends into the belt to the desired depth to finally secure and clinch the fasteners in the belt end.

Belt lacing machines, that are compact and lightweight for portability, are useful in remote locations including on-the-job sites, and find particular application in field-like operations. Therefore, portability and ease of use are vital characteristics for a roller lacer, which is utilized in a remote location, or removed from a permanent location. Further, the belt ends being repaired or having new fasteners applied are frequently required to be cut to square the leading edge for application of the fasteners. The belt ends may be marked with a line for cutting by a cutting machine, which line may be applied by methods known in the art. A problem may occur that the belt being worked upon may have a width greater than the width of roller lacer and it is desirable that the belt lacer be able to be used with belt widths greater than the belt lacer width.

Preferably, the belt lacers will be relatively lightweight so as to be portable and small so as to be used in cramped quarters in field locations and will be low in cost to be competitive with other belt lacers of the prior art.

SUMMARY OF THE INVENTION

The present invention is a lightweight, easily-portable, belt-lacing machine that includes a belt clamping apparatus and a belt cutter arrangement which provides the user with a complete assembly for repair and maintenance of a belt and belt ends by the installation of hook or C-shaped belt fasteners. Preferably, a single handle is used to move the cutter blade assembly to cut the belt and then the handle is switched to a second position to a roller carriage drive to roll the pointed fastener ends into the belt.

The belt lacing machine with a cutter blade apparatus and belt clamping device are integrally mounted in a common frame. The belt lacer provides rapid attachment of multiple fasteners to a belt end, and utilizes a dual roller arrangement operable along a track or guide structure, which rollers are driven by a sprocket and shaft mechanism along a chain. The rollers are adjustable to vary the gap separation between the roller circumferences to accommodate varying belt thicknesses and incrementally change the gap during fastener clinching. One or more interchangeable combs are used for different sizes of the same fastener or for different wire or stamped thin plate C-shaped fasteners.

The cutter blade is also driven by a sprocket and chain apparatus, which blade and drive apparatus are positioned in a separate housing. The drive shafts for the cutter blade are recessed in the cutter blade housing, thus removing them as an obstacle to belt insertion, or as an obstacle to the operation of the clamping means or roller lacer. The cutter blade is operable in both a forward and a reverse direction in the cutter blade channel; and the drive means for both the cutter blade and belt lacer are operable by the common handle. The belt lacer is designed to cut belts of a width wider than the width of the roller lacer and to apply the belt fasteners to belts having a width greater than the width of the belt lacer.

The structural and housing members are lightweight tubular structures secured between outer frame panels with a base support. The present inventive arrangement utilizes the mechanical apparatus to enhance the structural strength characteristics of the tubular members to provide stability to the belt lacer assembly without increasing the unit mass and weight.

BRIEF DESCRIPTION OF THE DRAWINGS

In the Figures of the drawing, like reference numerals identify like components, and in the drawing:

FIG. 3 is a side elevational view of the assembly along the line 3—3 of FIG. 2;

FIG. 4 is a plan view of a cutter assembly taken along the line 4—4 of FIG. 2;

FIG. 5 is a sectional side view of the cutter assembly of FIG. 4 taken along the line 5-5;

FIG. 6 is a detailed front view of the cutter blade carriage of FIG. 5;

FIG. 7 is a side elevational view of the cutter blade carriage shown in FIG. 6;

DETAILED DESCRIPTION OF THE PREFERRED EMBODIMENT

Figure 1:
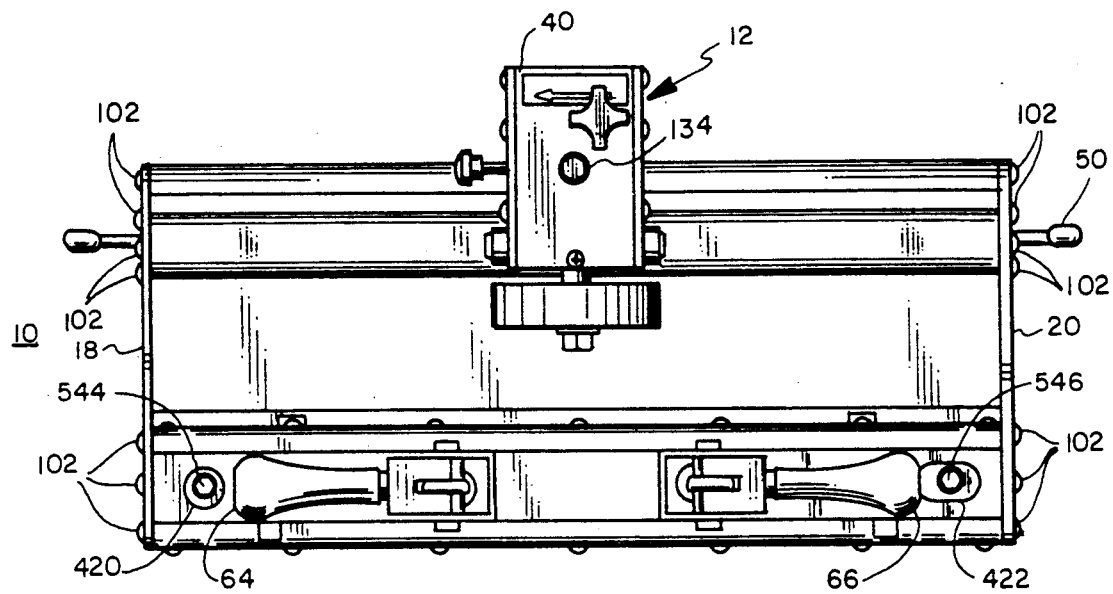
FIG. 1 is a plan view of a preferred embodiment of a roller lacing assembly.
Figure 2:
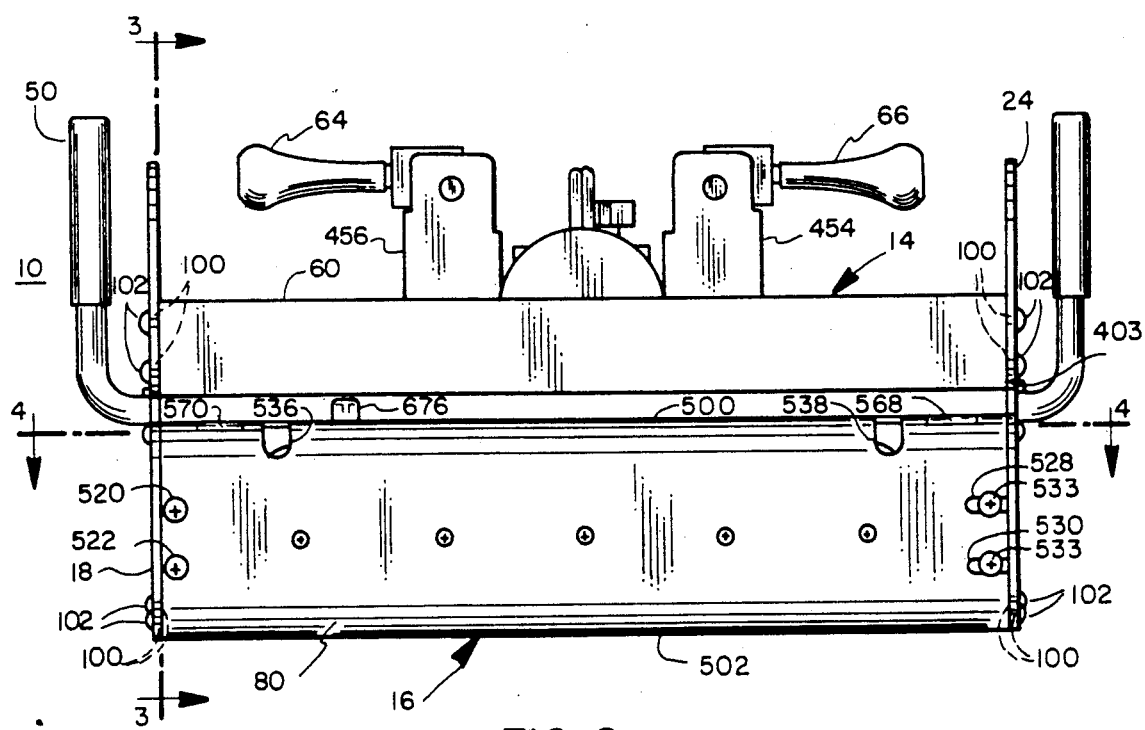
FIG. 2 is a front elevational view of the assembly of FIG. 1.
Figure 8:
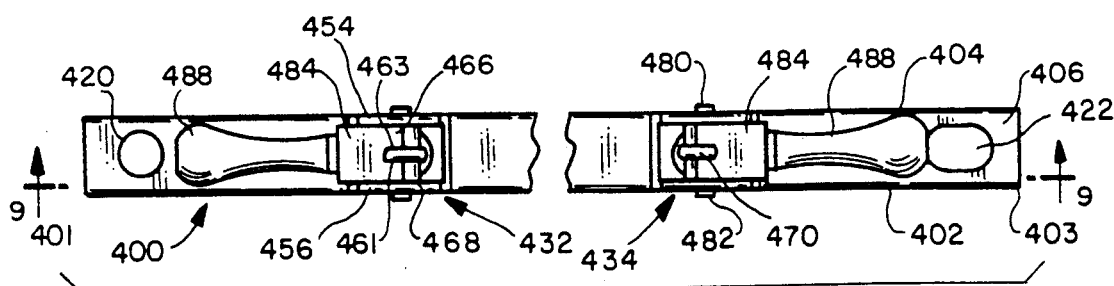
FIG. 8 is a plan view of the clamp assembly as shown in FIG. 1.

In FIGS. 1—3, belt lacing assembly 10 includes a roll carriage means 12, clamp apparatus or means 14 and cutter blade assembly 16. These subassemblies 12, 14 and 16 are secured in position generally by frame means including first and second outer frame end walls or end panels 18 and 20, and base member 22. To lift and carry the assembly, the end walls each have a hand grip opening 23 therein to define a handle 24 thereof which handle is integral with its respective end wall. The handles 24 are aligned and provide a means to carry the unit.

Roll carriage means 12, as noted in FIG. 3, includes a housing 40, a roller drive shaft 42, an upper or first roller 44, a lower or second roller 46, a guide extrusion assembly 48 and a lock handle 50. Clamping apparatus 14 has a clamping outer extrusion or enclosure 60, with an enclosure end plate 62 in proximity to first frame 18. A similar end plate is also provided at the opposite or other end of enclosure 60 in proximity to second frame panel 20. First and second clamping handles 64 and 66 of claim apparatus 14 are operable to move the clamp apparatus between the reference or disengaged position in FIG. 2 and a belt-engaging or extended position. The belt is clamped by the clamping apparatus 14 in position beneath the first upper roller 44 and the lower roller 46 and these rollers and driven to collapse pointed ends 15 (FIG. 16) on each of a line of pointed belt fasteners 17 into a belt end 19. The use of such upper and lower rollers being driven along the length of hook belt fasteners to push the pointed ends thereof into opposite faces of the belt end is a well-known technique.

Prior to rolling the pointed ends 15 of the belt fasteners 17 into the belt end 19, the belt end was often cut in the field to provide the desired length of belt or to remove jagged or torn pieces at the belt end. This was done either manually by a knife or by a separate-powered blade apparatus. To provide a belt edge, which is perpendicular to the longitudinal axis of the belt, a line is often drawn on the belt using a square. The perpendicular belt edge is desired to align the belt fasteners which have loop ends which define a tunnel or bore to receive the hinge pin (not shown) that will join adjacent and opposing sets of belt fasteners intermeshed to receive the hinge pin and thereby join the belt ends together to complete the belt loop.

Figure 18:
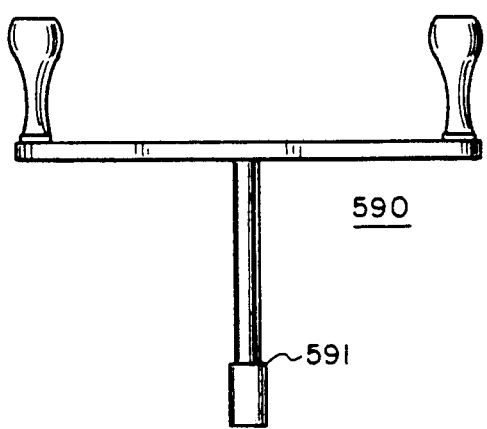
FIG. 18 is an elevational view of a drive handle.

In accordance with the present invention, the belt lacer assembly 10 is provided with the cutting means 16 which cuts the belt being clamped in the clamping means 14 prior to attachment of the belt fasteners 17 to the now cut belt end 19. The preferred and illustrated apparatus uses the same clamping means 14 for both the belt cutting operation and for the fastener clinching operation; and also, as will be explained, it is preferred to use the same manual operator such as handle 590 (FIG. 18) for driving either a knife carriage 630 (FIGS. 6 and 7) or a roller carriage means 12 having the clinching rollers 44 and 46 which push the pointed ends 15 of the belt fasteners into the belt.

The belt lacer assembly 10 is relatively small and lightweight so as to be portable and easily carried to a location and positioned over belt ends in the field and is small so as to be used i cramped working places. Lightweight and low cost are achieved by the use of aluminum extrusions. Preferably, extrusions 48, 60 and 80 extend the width of the apparatus between vertical end walls 18 and 20. The blade carriage 566 is driven across the belt end to cut the belt by a handle which can be connected to a drive sprocket to rotate an endless drive means such as a chain to pull a knife carriage 630 and a knife blade thereon through the belt to sever the end therefrom. The carriage means 12 is driven by rotating a shaft 146 to which is fixed a sprocket 148 that is meshed in a stationary chain 320. The sprocket translates along the stationary chain to drive the carriage means as the shaft is rotated by a handle. The handle is releasably connected by means such as a female socket 591 and a male hex head, on the handle and the drive sprocket, respectively.

Figure 12:
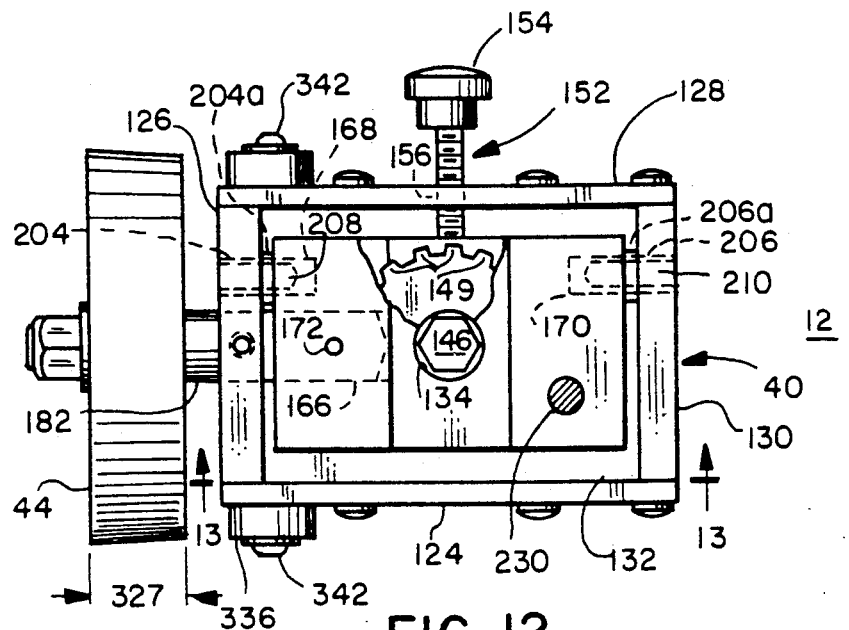
FIG. 12 is an enlarged plan view of the roller carriage as shown in FIG. 1.
Figure 13:
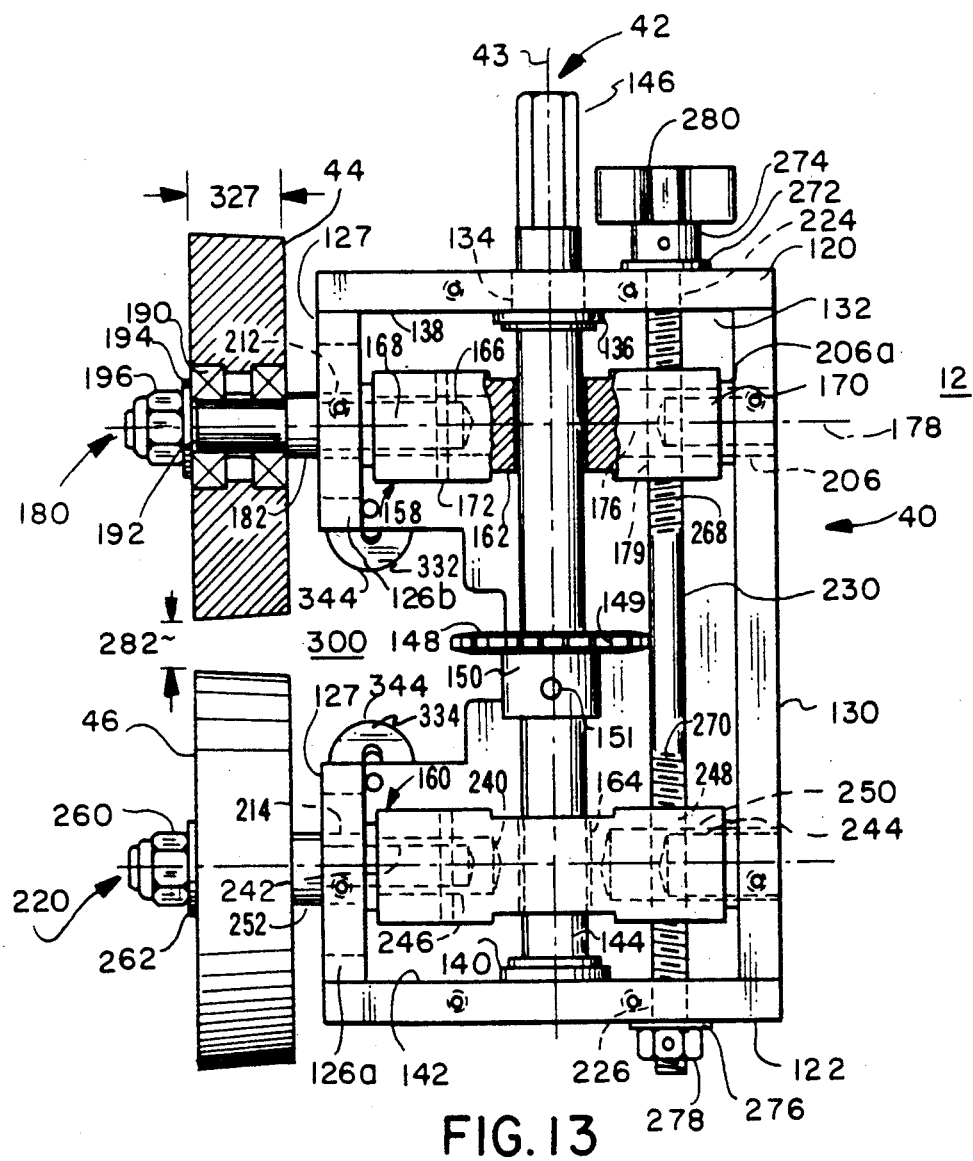
FIG. 13 is a side elevational view in partial section of the roller carriage in FIG. 12 taken along the line 13—13.
Figure 14:
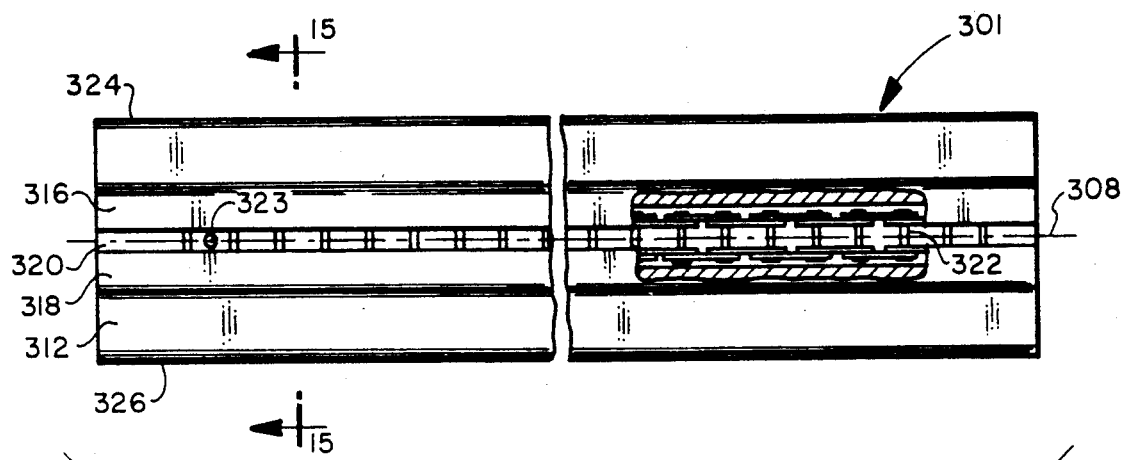
FIG. 14 is an enlarged rear elevational view of the belt lacer guide and chain drive.

Herein, the handle may be connected and turned to the knife blade drive sockets to drive the knife blade either to the left or the right from either side of the apparatus. To accomplish this, one merely disconnects the handle socket from the left or right male drive end 604 (FIG. 5) and places on the other drive end 604. Likewise, the clinching rollers are driven by the same handle which may be attached to either a left end drive shaft end 146 (FIG. 12) or a right hand shaft end 146 to turn the drive sprocket to move the endless chain to shift the roller carriage. Only a single handle 590 is preferred to assure that an operator will not hit his knuckles or hand on another adjacent handle from knife drive when doing a clinching drive or visa versa.

The belt lacer apparatus 10 is usable with belts that are wider than the housing because slots 63 (FIG. 3) are formed in the end walls 18 and 20 of the housing, as best seen in FIG. 3 which allow the belt end 19 to extend beyond the sidewalls. Also, the drive end 604 for the respective knife is located at or below the plane of lower edge of the slots in the end walls.

Figure 20:
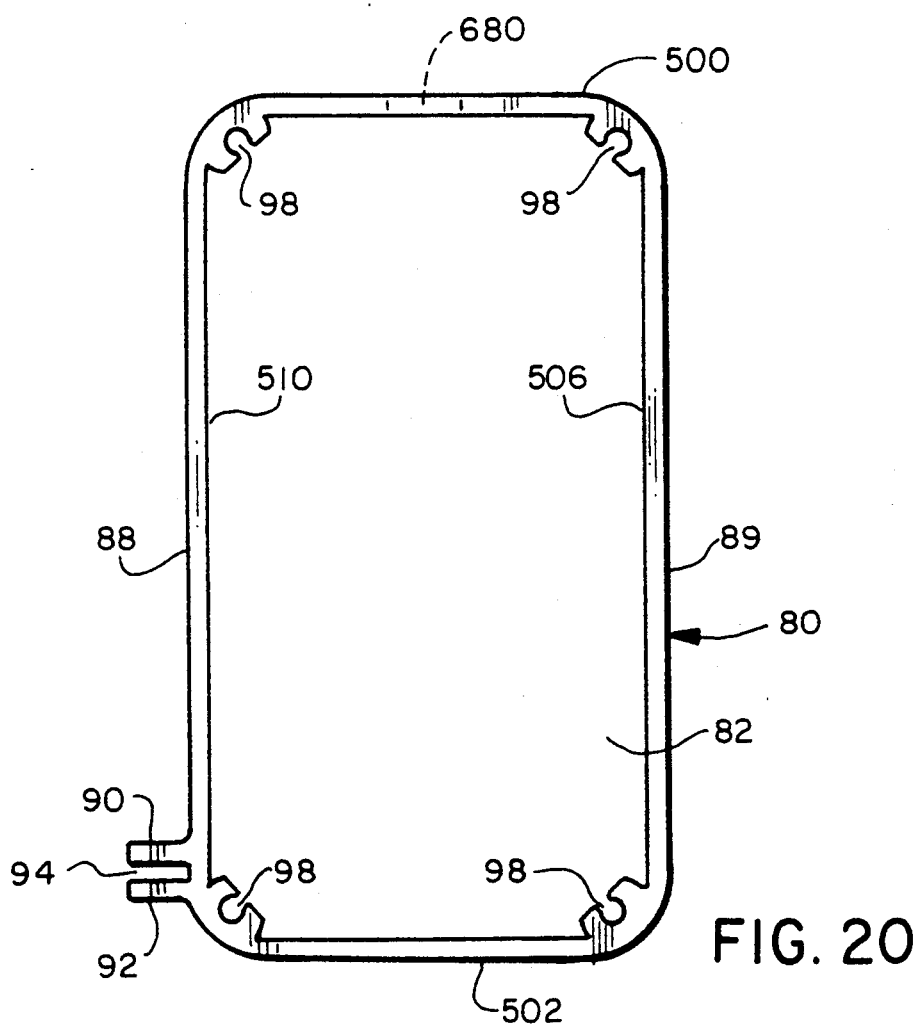
FIG. 20 is an enlarged end view of the cutter blade extrusion housing.

In FIG. 3, a cutter housing 80, preferably in the form of a tube, has cutter housing chamber 82 with a first cutter drive sprocket 84 and first drive sprocket housing 86 positioned therein. Back face 88 of cutter housing 80 has an upper sill 90 and lower sill 92 extending therefrom with a groove 94 therebetween (cf. FIG. 20). A shelf 96 extends horizontally from base member 22 and nests in groove 94. The guide extrusion assembly 48, base member 22, cutter housing 80 and clamp end plate 62 are each provided with a plurality of securing means bores 98 at each of their ends. Similarly, first and second frame panels 18, 20 have a plurality of passages 100 alignable with bores 98 to receive securing means 102, shown as bolts, to secure the several members 12, 14, 16 and 22 therebetween, and this configuration provides a rigid structural arrangement with shell-like extrusion members providing a lightweight skeletal structure between frame panels 18, 20.

As illustrated in FIGS. 12-17, belt lacer housing 40 has a generally rectangular cross-section with a top wall 120, a bottom wall 122 and first, second, third and fourth sidewalls 124, 126, 128, 130, and a cavity 132. Roller drive shaft 42 extends through a bore 134 in top wall 120 and a first bearing and bushing arrangement 136 mounted and secured on inner surfaces 138 of top wall 120. A second bearing and bushing arrangement 140 is mounted on upper surface 142 of bottom wall 122 to receive lower end 144 of drive shaft 42. As noted in the Figures, shaft 42 with longitudinal axis 43 is vertically oriented and has a hexagonally-shaped second or upper end 146 extending above top wall 120, which upper end 146 can receive a driving means to rotate shaft 42.

A first sprocket 148 with a plurality of sprocket teeth 149, and a collar 150 with a lock screw 151, are mounted on shaft 42 in cavity 132 and are positionable along the shaft for operation with a cooperating member to move roller lacer housing 40, as will be described below. Set screw or lock means 151 in collar 150 is used to secure collar 150 to shaft 42. A threaded lock means 152 with a turning knob 154, as noted in FIG. 12, extends through threaded bore 156 of third sidewall 128 and is operable to engage and secure sprocket 148 and shaft 42 from rotation. Thus lock means 152 is operable to secure roller lacer 12 during its transport or storage, or to prevent inadvertent movement of roller lacer 12.

First roller 44 and second roller 46 are mounted and operable carriage means 12 having first and second carriage blocks 158 and 160, respectively, which are mounted and operable in cavity 132. As noted in FIGS. 12, 13, 21 and 22, first block 158 has a first elliptically-shaped passage 162 vertically extending through first crimp block 158 along axis 43. Similarly, second crimp block 160 has second elliptically-shaped passage 164 generally aligned with passage 162 along axis 43. First crimp block 158 provides a roller shaft passage 166; a first front pivot pin bore 168; a first rear pivot pin bore 170; a first cross-pin port 172; a first crimp block adjusting nut notch 174; and a first adjusting nut bore 176. As noted in FIG. 13, shaft passage 166, first front pivot pin bore 168, first rear pivot pin bore 170, and first adjusting nut bore 176 are generally perpendicular to longitudinal axis 43, and parallel with first roller shaft axis 178 of first roller shaft 180. Alternatively, first cross-pin port 172, and first crimp block adjusting notch 174 are approximately parallel with longitudinal axis 43 and, the sidewall 163 of elliptically-shaped passage 162.

Figure 21:
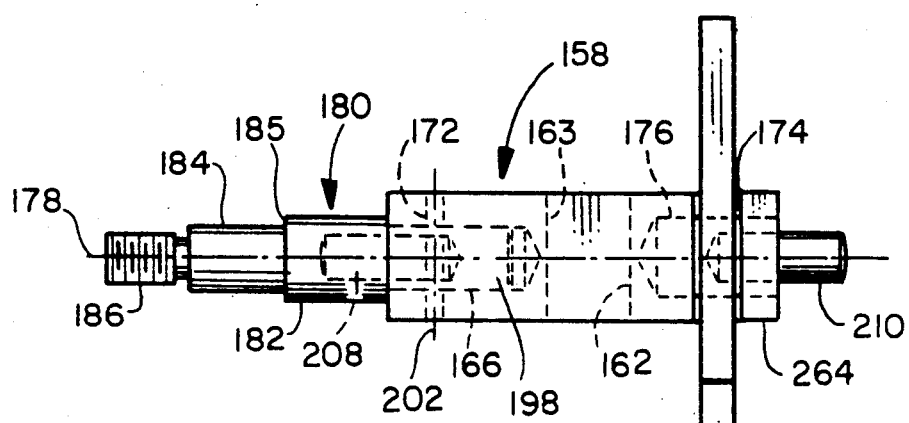
FIG. 21 is a side view of the roller crimp adjusting assembly.
Figure 21:
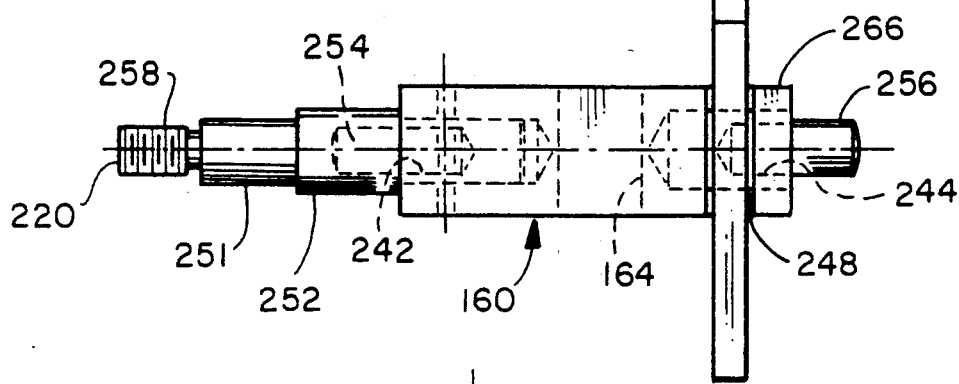
Figure 22:
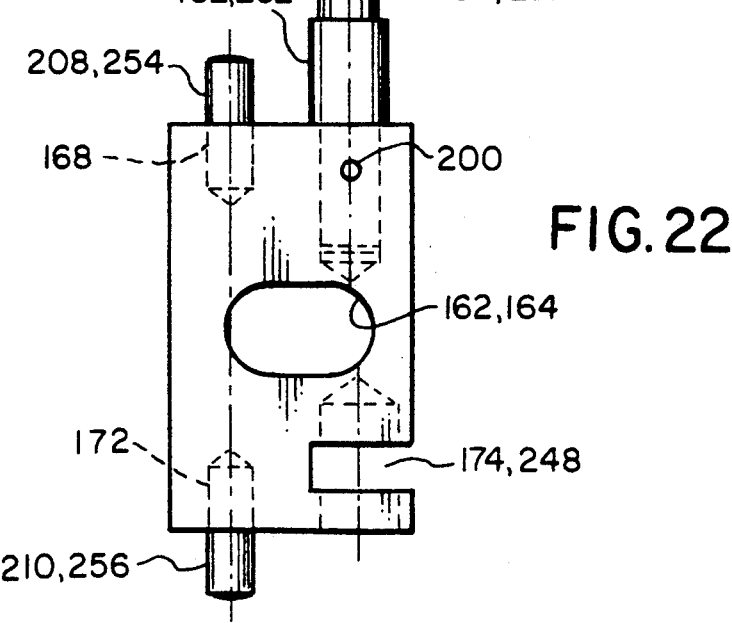
FIG. 22 is a plan view of a roller crimp adjusting block.

As best seen in FIGS. 21 and 22, first block 158 has a roller shaft 180 mounted and secured in shaft passage 166, which shaft 180 includes a bushing or shoulder 182, a bearing surface 184 and threaded end 186 sequentially extending from first adjusting block 158 along axis 178. First roller 44 has a bearing 190 with an aperture 192 for mounting roller 44 on bearing surface 184 to abut shoulder 185 between bearing surface 184 and bushing 182. Washer 194 and securing means 196, shown as a nut, are secured on threaded end 186 to secure first roller 44 on first roller shaft 180. Stub shaft 198 extending from bushing 182 has a transverse passage 200 therein. Stub shaft 198 is positioned in shaft passage 166 with transverse passage 200, which is aligned with cross-pin port 172 to receive a cross pin 202 to secure first roller shaft 180 in shaft passage 166, with bushing 182 abutting first crimp-adjusting block 158. Second housing sidewall 126 and fourth housing sidewall 130 have first crimp-block first and second bushings 204 and 206, which are aligned with crimp block pivot pin bores 168, 170, respectively. A first pivot pin 208 and second pivot pin 210 are press fitted into bores 168 and 170 (FIG. 22) to provide pivot pins and a pivot axis about which the upper roller 44 may pivot toward or away from the lower roller 46 with turning of the adjustment screw 230, as will be explained. The pivot pins are mounted for turning in flanged bush bearings 204 and 206 which have flanges 204a and 206a.

Second sidewall 126 has an upper segment 126b and a lower segment 126a, each of these segments having a front surface 127 with an ovate or elliptically-shaped elongated slot 212, 214, with first roller drive shaft 180 and second roller drive shaft 220 extending therethrough, respectively.

Second crimp-adjusting block 160 and second roller 46 are mounted and operable in chamber 132 Second crimp block 160 has: second roller shaft passage 240; front pivot pin bore 242; rear pivot pin bore 244; second cross-pin port 246; a second crimp-block-adjusting nut notch 248; and a second adjusting nut bore 250. Second roller 46 has a second bearing centrally positioned in roller 46 with an aperture (not shown) to receive second drive shaft bearing surface 251, which second bearing and aperture are similar to the elements in first roller 44. Bushing 252 on second drive shaft 220 contacts second adjusting block 160. Front and rear pivot pins 254, 256 identical to pivot pins 208 and 210 for the upper block extend through front and rear flanged bushings 242, 244, respectively to provide a pivot means for second crimp block 160. Threaded end 258 of shaft 220 is operable to receive second securing nut and washer 260, 262 to secure second roller 46 on shaft 220. Top wall 120 has a first adjusting rod bore 224 aligned with a second adjusting rod bore 226 in lower wall 122. Adjusting rod 230 extends through first and second adjusting rod bores 224, 226, chamber 132, and adjusting block notches 174, 248. Adjusting rod securing nuts 264, 266 extend through first and second notches 174, 248 and engage the upper and lower threaded sections 268, 270 of rod 230. Rod 230 has first washer 272 and bushing 274 at upper wall 120, and second washer 276 and lock nut 278 at lower wall 122 to secure rod 230 in position therebetween. A knob 280 for adjusting the rod is mounted atop bushing 274 and is operable to rotate rod 230. Threaded sections 268, 270 are oppositely threaded, that is one is right-hand threaded and one is left-hand threaded. Therefore, as rod 230 is turned, first and second crimp-block assemblies 158, 160 are pivotable on pivot pins 208, 210 and 254, 256, respectively, in opposite vertical directions along longitudinal axis 43 to vary the gap separation distance 282 between rollers 44 and 46.

Housing 40 has a notch 300 extending into cavity 132 between sidewall segments 126a and 126b, as well as first sidewall 124 and third sidewall 128, with sprocket 148 extending generally perpendicular to shaft 42 into notch 300. In FIGS. 14-17, guide extrusion assembly 48 has a guide extrusion 301 with a longitudinal slot 302 with lacing clamp assembly 304 in slot 302. Guide extrusion 301, which is mounted between and secured to first and second frame panels 18 and 20, has a wall 306 with a generally rectangular cross-section, a longitudinal axis 308, and an inner wall 310 bounding slot 302. Slot 302, which is generally enclosed by inner wall 310, has opening 314 along one face of rectangular wall 306, which opening 314 is approximately parallel to axis 308. Guide extrusion 301 has a rear outer surface 312 with a third sill 316 and fourth sill 318 extending generally parallel from wall 312 with second slot 320 therebetween. Second slot 320 is approximately parallel to longitudinal axis 308, along exterior surface 312 and opposite opening 314. A roller chain 322 is positioned and secured in second slot 320 by a rod or pin 323 secured in wall 312, which chain 322 is meshed with sprocket teeth 149 for driving operation of roll carriage means 12 by drive shaft 42.

Guide extrusion 301 has an upper surface 324 with a first longitudinal depression or channel 328 and a lower surface 326 with second longitudinal depression 330, which channels 328, 330 are parallel to axis 308 and extend along guide extrusion 301. Roll carriage means 12 has first upper and lower side guides 332, 334 mounted and adjustable on third sidewall 128, and second upper and lower side guides 336, 338 mounted and adjustable on first sidewall 124. Each of the side guides 332-338 has an outer surface 344 and an elliptical slot 340 to receive a securing means 342 to mount the guides to walls 124, 128 and allow outer surfaces 344 to mate with one of channels 328, 330. Thus belt lacer assembly 12 is longitudinally operable along guide extrusion 301 with lacing clamp assembly 304 secured in guide extrusion 301, and operable to retain a sleeve or subassembly of belt fasteners 17 (cf. FIG. 16) for mating with a belt end.

Lacing clamp assembly 304 includes a sleeve 367 with a generally rectangular cross-sectional shape and an open back wall 368; an enclosure 370; and, a second wall 372 generally parallel with open back wall 368, which second wall 372 has an outer surface 373 with a groove 374. A pressure strip 376, such as neoprene rubber, is positioned and secured in groove 374 and is aligned with guide extrusion opening 314 to contact fasteners 17. Bearing strip 378 is positioned in enclosure 370 and abuts back wall 368, and a biasing means 380, such as an elongated wavy spring of spring metal, is inserted in enclosure 370 between bearing strip 378 and front wall 372 to bias the bearing strip 378 against the tubular member 360. Lacing clamp assembly is slidable in slot 302 generally between opening 314 and inner wall 310 to receive fasteners 17.

Figure 19:
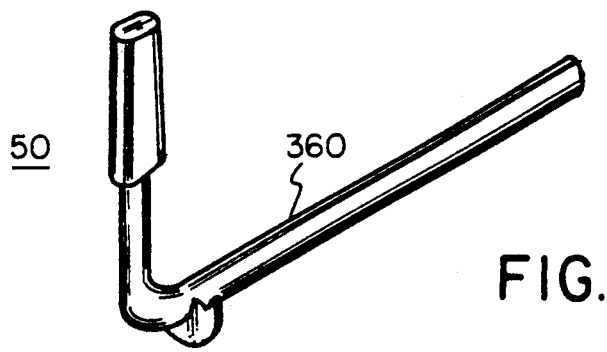
FIG. 19 is an oblique view of a lock handle and lock-handle stop.

Lock handle 50 (cf. FIGS. 2, 3 and 19) has a tubular member 360, with a generally elliptical or ovate shape, which member 360 is positioned in guide extrusion notch 302 (cf., FIG. 15) between inner wall 310 and bearing strip 378 of lacing clamp assembly 304. Belt fasteners 17 are positioned and retained in lacing clamp assembly 304 and guide extrusion 301 for mounting on belt end 352. The lock handle 50 extends through the side frame panels 18, 20 and is rotatable to engage tubular member 360 with bearing strip 378 to urge belt fasteners 17 into engagement with a belt end 352. A lock handle stop 354, shown in FIG. 19, is provided to locate handle 50 in guide extrusion 301.

Figure 15:
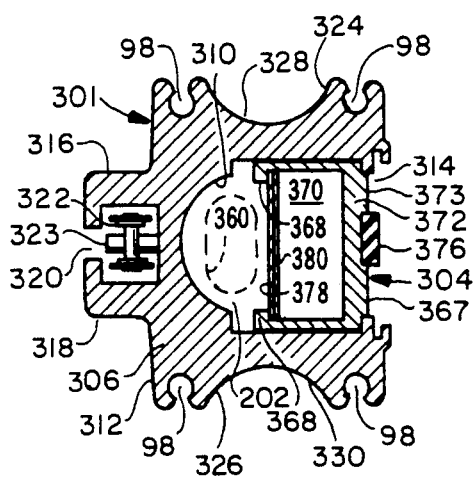
FIG. 15 is an enlarged sectional side view of the lacer guide extrusion taken along line 15—15 in FIG. 14.
Figure 16:
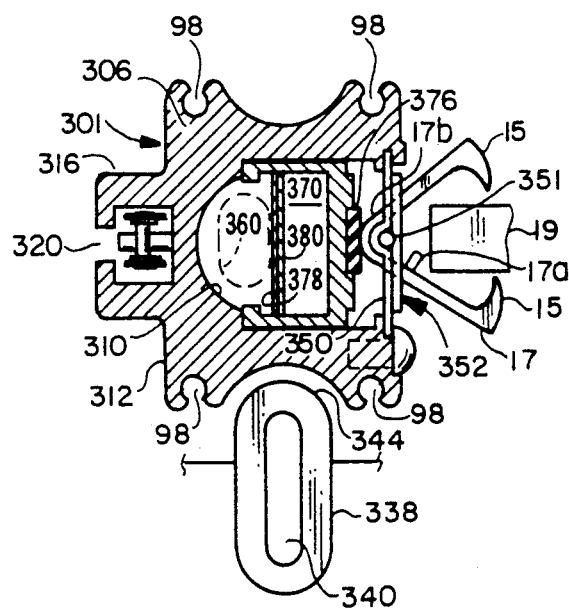
FIG. 16 is an exemplary illustration of a belt end and fastener in the lacer guide extrusion.
Figure 17:
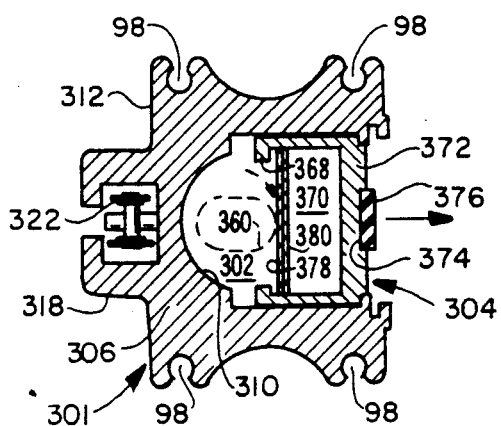
FIG. 17 is a sectional side view of the assembly guide extrusion and clamp extrusion with the lock handle biasing the fasteners to the belt end.

Fasteners 17 are held in a comb 350 (FIG. 16) with the loops of the fasteners held in slots in the comb. The comb 350 is a thin strip of metal with a row of slots into which are inserted each of fastener hinge loops of the row of belt fasteners 17. The latter are mounted on the paper carding which holds the loops of the fasteners at fixed distances and aligned to enter the slots in the comb. A gauge pin 351 is threaded through the loops. The belt end 19 is brought against belt stops 17a on the fasteners and the lock handle is turned to cause the lacing clamp assembly to move to the right, as seen in FIGS. 15-17, to cause the strip 376 to push on the U-shaped, hinge pin loops 17b of the fasteners to push each of them to abut their respective belt stops tightly against the belt end 19. In this manner all of the fasteners in a strip are aligned with their hinge loop openings 17c which are held by gauge pin 351 (FIG. 16) which extends between the comb 350 and paper carding 352 and projects through the fastener loops. With the belt fasteners locked in place, the paper carding 352 holding the belt fasteners in a strip may now be removed. The illustrated comb takes hook belt fasteners of sizes 2, 3, 4, 5 and 6 each of which protrudes a different amount from the belt stop to the outer surface of its belt loop. The lacing clamp assembly 304 will slide differing amounts with turning of the lock handle 50 depending on the amount of belt loop protrusion from the belt end. With the fasteners abutted at their loops by the strip 376 and a gauge pin slid into the openings 17c defined by a series of aligned loops 17b, the fastener ends are ready to be rolled into the belt fabric. In the case of using of plate-type fasteners rather than the illustrated hook-type fasteners, the illustrated comb for the hook fasteners must be replaced by another similar comb having slots and spaces sized for the plates of these belt fasteners.

In FIGS. 8-11, housing 400 of belt clamping assembly 14 is illustrated as a generally U-shaped structure with a first end 401, a second end 403, front wall 402, rear wall 404 and top wall 406 and an open bottom, enclosing a channel 408, as shown in the several Figures. A first clamp bolting plate 412 and second clamp bolting plate 414 each have first and second bolt passages 416, 418 to receive securing means 102. Thus housing 400 and clamp assembly 14 are secured between frame plates 18 and 20 and are generally parallel to guide extrusion assembly 48. Top wall 406 has a first drive shaft portal and a second drive shaft portal 420, 422, at first and second ends 401, 403. One of portals 420, 422 has an ovate or elliptical shape to accommodate variation in cutter blade drive shaft locations, as will be noted below. In addition, top wall 406 has first toggle passage 424 and second toggle passage 426 (noted in FIG. 9) to receive connecting first and second toggle shafts 428, 430 of first and second toggle assemblies 432; 434, respectively.

Clamping assembly 14 further includes a second elongated U-shaped member 436 with first and second sidewalls 438, 440 and upper wall 442, which member 436 is shorter than first channel or housing 400. Upper wall 442 provides a first bore 444 and second bore 446 alignable with first toggle passage 424 and second toggle passage 426, respectively. Second U-shaped member 436 is mounted in channel 408 of housing 400 and secured there to first and second toggle shafts 428, 430. In the Figures, toggle shafts 428, 430 have cross pin bores 448 and extend through passages 424, 426 and bores 444, 446 to secure second U-shaped member 436 with pins 450, 452 in their respective cross-pin holes 448.

Toggle assemblies 432, 434 are similarly constructed and will be similarly labeled. Each assembly has a pivot support with a first upright member 454 and second upright member 456 extending normal to top wall 406, which uprights provide a slot 458 therebetween. First and second toggle shafts 428, 430 extend through first and second toggle passages 424, 426 into slots 458. Toggle shafts 428, 430, illustrated in FIG. 11, each have a collar 460 along their shaft length with a greater diameter than the cross-sectional diameter of the toggle shafts 428, 430. Toggle shafts 428, 430 have a narrow upright member 464 with a generally rectangular shape and rounded crown at each shaft upper end, which narrow members have with a front face 461, a rear face 463 and a crossbore 462. A pivot block clamp 465 is provided for each toggle shaft and is a fork-like member with a first wall 466, a second wall 468, a first through-passage 472 and second through-passage 474 extending through walls 466 and 468. A connecting pin 476 and bushing 478 extend through aligned crossbore 462 and second through-passage 474 to couple toggle shafts 428, 430 with a pivot block 465. The through-passage 457 of each of uprights 454, 456 are aligned with first through-passage 472 of pivot block clamp 465 and a first half-shaft 480 and second half-shaft 482 extend therein, to approximately abut shaft upright member 464, thereby securing the pivot block 465 for each shaft 428, 430 to its respective clamp assembly uprights 454, 456. Each pivot block 465 has a body 484 with a central blindhole passage 486 for securing an operating handle 488 to pivot block 465. In addition, a bias means, illustrated as coil spring 490, has shaft 428 or 430 extending through it and is secured between collar 460 and upper wall 442 of second member 436.

Figure 9:
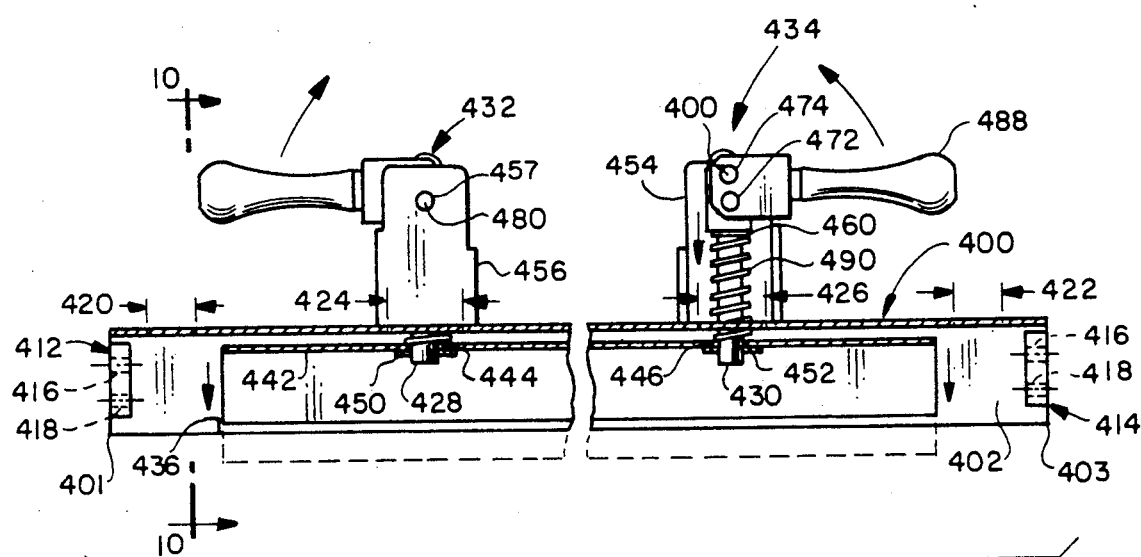
FIG. 9 is a side elevational view of the clamp assembly of FIG. 8 taken along the line 9—9.
Figure 10:
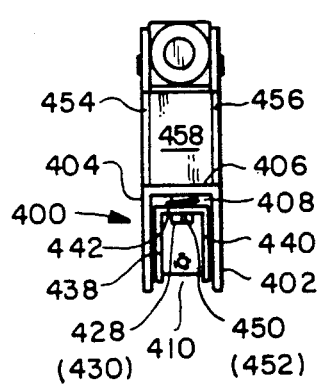
FIG. 10 is a side elevational view in partial section of the clamp assembly as shown in FIG. 9 taken along the line 10—10.
Figure 11:
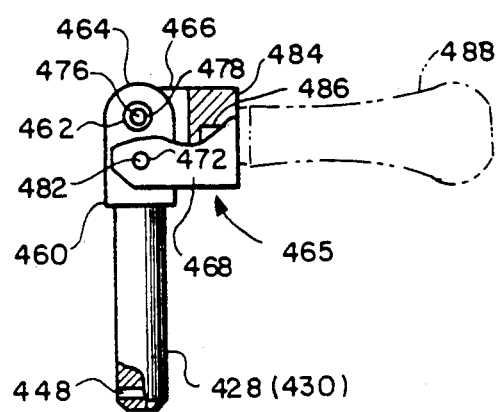
FIG. 11 is an enlarged view in partial section of the toggle and pivot pin assembly of a clamp assembly handle in FIG. 8.

Belt-clamping assembly 14 is shown in FIG. 9 in a reference position with second member 436 withdrawn into housing channel 408, and having handles 488 parallel to the longitudinal axis 308 of extrusion guide 301 and housing 400. Bias means 490 is operable against collar 460 to bias second member 436 to extend from housing channel 408, as shown in FIG. 9 in dashed outline, to contact a belt and secure it against cutter assembly 16. The handles 488 pivot on half-shafts 480 and 482 to move the toggle shafts 428, 430 to operate second member 436 to either extend from or be within housing channel 408.

Housing 80 of cutter blade assembly 16, as shown in FIGS. 2-5 and 20 in a preferred embodiment, has a generally rectangular cross section with a cutter-housing chamber 82. Housing 80 has parallel back side 88 and front side or wall 89 as well as top and bottom wall surfaces 500 and 502, respectively. A first guide bar 504 is mounted on cutter-housing chamber front surface 506, and a second guide bar 508 is mounted on second cutter-housing chamber back surface 510, which guide bars 504, 508 are approximately parallel to each other along the longitudinal axis of housing 80. The housing 80 has a plurality of bores 512 extending through front wall 89 and back wall 88 to receive securing means 514, such as screws or bolts, to secure first and second guide bars 504 and 508 in chamber 82 of housing 80. Extruded housing 80 has first end 516 and second end 518, with upper and lower mounting ports or passages 520, 522 in front wall 89 and a second pair of upper and lower passages in back wall 88 at one of the first and second ends 516, 518. At the other of the first and second ends 516, 518, second end 518 as shown in FIG. 2, there are first slots 528 and 530 in front side 89 and a second pair of slots 532, 534 on back wall 88 (cf. FIG. 5), which pairs of slots are generally parallel and operable to receive one of the cutter drive bearing mountings, to be described below. These drive bearing mounts include a block 556 which is fastened by screws 533 mounted in the horizontal slots 528, 530 and 532 and 534 and threaded into the block with the heads of the screws abutting the outer sides of the front and rear sidewalls 88 and 89. By loosening the screws 533, the right hand block 556 may be shifted to the right, as viewed in FIG. 5, to tighten the chain. Tightening of the screws 533 will lock the tightened chain, this having been accomplished without having to go into the interior of the cutter housing chamber 82. In addition, housing 80 has access passages or holes 536 and 538 at the upper surface of front wall 89 in proximity to either of first and second ends 516, 518, respectively. These access holes 536, 538 are positioned to allow change of a cutter blade 676 without removal of the frame end plates 18, 20 and bearing mountings.

More specifically, to change a blade 676, as best seen in FIGS. 6 and 7, the cutter blade carriage is positioned opposite one of the access openings 536 and 538 and Allen head socket tool is inserted into the opening and into a socket on a threaded bolt 677, which secures the blade to a cutter holder 566, and is turned to loosen the bolt to allow the operator to pull the blade upwardly from a notch 666 in front face 634 of the cutter holder. The lower end of the blade has an elongated slot 676a which slides over the shank of the securing bolt 667. A new blade is then slid into the notch with the slotted lower end of the blade sliding down past the bolt shank until the top of the slot bottoms out on the bolt shank. The bolt is then tightened and the tool is removed from the access hole 536 or 538. Thus, a blade may be replaced or adjusted in height without removal of the frame side walls.

Positioned at each first and second end 516, 518 in chamber 82 are one of first and second drive assemblies 540 and 542, which assemblies include sprocket shafts 544 and 546 and cutter drive sprockets 550, 552 mounted in bearing blocks 554, 556, respectively. As noted in FIG. 5, bearing block 554 is secured at ports 520, 522, 524 and 526 by securing means 558, such as bolts. The bearing blocks 554, 556 each have first and second grooves 560 and 562 on opposed face 562, 563, as shown in FIG. 3, which grooves 560, 562 mate with guide bars 508, 504, respectively. A shim 564, shown in FIGS. 3 and 4 is interposed between chamber inner surface 506 at both bearing blocks 554, 556. The aluminum extrusions used are lightweight and inexpensive but cannot be held to close tolerances. The present invention overcomes these tolerance problems by the loading of everything to one side i.e., against one extrusion and leaving tolerance spaces or gaps at the other side which are then filled by shims such as shims 564. Thus, shims 564 bias the bearing blocks 554, 556 and second drive assemblies 540, 542 to one side (the back-wall 88 in this example) of housing 80 thereby utilizing the housing strength and the supporting characteristics of the guide bar to strengthen the overall structure of the assembly. This provides added rigidity and stability to the cutter knife and cutter blade carriage 566 during its operation, and to stabilize the cutter blade assembly. The chains come in nominal lengths and have differences in length that need to be taken up to keep the chains taut and not too slack. Also, over a period of time the chain may need to be re-tightened. This is achieved in the present invention without having to go into the interior of the apparatus because the bolts 515 holding the bearing blocks and the chain sprocket 552 may be loosed and the sprocket and its shaft shifted to the right as viewed in FIGS. 4 and 5 with the bolts sliding to the right in elongated slots 528, 530 and 532, 534 in the respective front and back walls 88 and 89. When the chain has been tightened, the bolts 515 are also tightened to clamp against the front and back walls. An ovate hole or passage 568, shown in dashed outline in FIG. 4, in the upper surface 500 of housing 80 and a similar hole or passage in the lower surface of the housing allow shifting of the bearing block 556 and drive shaft when tightening the chain. More specifically, bearing block 554 and its sprocket shaft 544 are positioned in alignment with a second hole or passage 570, which may likewise be ovate, but is generally circular, which passage 570 is in alignment with ovate passage 568 in upper surface 500 of housing 80. Sprocket shafts 544 and 546 have hexagonal shaft ends 604 which extend through the ports or passages 570, 568 as well as clamp assembly drive shaft portals 420, 422, respectively, for mating with and operation by a drive handle 590 (FIG. 18), which is also utilized to drive the roller lacer sprocket 148.

Each of bearing blocks 554, 556, has a vertical through-bore 592, with a bearing 594, such as a sleeve bearing, has a drive shaft 544 and 546 extending therethrough. Each of shafts 544 and 546 has a lower or first end 596 with a cross-pin hole 598. A collar 600 with a securing means 602, such as a dowel pin, is positioned along the upper portion of each shaft 544, 546, and an annular washer 608 is mounted on lower end 596 of each shaft 544, 546 extending from its respective bearing block. Thereafter, a cross-pin such as a cotter pin 610, is positioned in each cross-pin hole 598 to secure the shafts 544, 546 in bearing blocks 540, 542. Collars 600 are affixed along shafts 544, 546 to adjust the vertical height of upper end 604 of each shaft.

A cutter assembly 630, which is illustrated in FIGS. 4–7, is mounted and operable in enclosure 82 by drive assemblies 540, 542. Cutter block assembly 630 has cutter holder or carriage 566 with a front face 632, and a rear face 634, which faces have first and second parallel grooves 636 and 638, respectively. A blade holder 640 extends generally vertically upward from carriage 566. Upper front roller pair 642 and lower front roller pair 644 are positioned on front face 632 of cutter blade holder 566, on opposite sides of groove 636, as illustrated in FIGS. 6 and 7. Similarly, a second set of upper and lower rollers 646 and 648 are positioned on rear face 634 of the blade holder 566. The front and rear rollers 642, 644, 646 and 648 are operable with guide bars 504, 508 therebetween, along front and rear faces 632, 634.

To provide low friction guiding of the blade to cut a straight line across the belt end, the blade and blade carriage are guided along the bars 504 and 508 by slide blocks 650 and 652 preferably formed of a low friction plastic such as Delrin. The bearing slide block 650 is secured in first groove 636 and similar slide block 652 is secured in second groove 638. These slide blocks 650, 652 are utilized as bearing surfaces for contact with guide bars 504, 508 and to maintain the cutter block assembly 630 in a position to travel along a straight line in chamber 82 during operation. The rollers 642 and 644 also provide a low friction rolling contact with the top and bottom surfaces of the guide bars as the blade carriage travels therealong against the resistance of the cutting blade as it is pulled through the belt. A second shim 654 is positioned between the base 656 of groove 636 and the slide block 650, on the same side of the housing as shims 564 for the drive assemblies 540, 542.

It will be appreciated that the cutter housing is in the form of a hollow extrusion having four spaced walls interconnected to define a tube and that this makes assembly of the above-described blade carriage drive and guiding means within the tube more difficult.

A unique means of assembly and adjustment is provided for by the use of shims 564 and 654 and rail 508 and 504. To assemble the mechanism into tube 80 a bearing block 540 is bolted to rail 508. The purpose of the rail 508 is so the unit can be bench assembled and then inserted in the tube. The cutter assembly 630 is placed on the rail 508 along with bearing assembly 542. The chain 555 is then installed and rail 504 is put in place. The above assembly which includes 540, 508, 630, 542, 555 and 504 is placed as a unit into tube 80. Measurements between the bearing block 540 and tube 80 are taken and the unit which includes 540, 508, 630, 542, 555 and 504 are then removed. Appropriately sized shims 654 and 564 are then installed; and then this unit, which includes 540, 508, 630, 542, 555, 504, 654 and 564, is now re-installed in tube 80 and bolted in place.

Blade holder 640 includes a body 660 with a front surface 662 generally aligned with front face 632 of carriage 566, and a rear surface 664 aligned with rear face 634 of carriage 566. A notched portion 666 is provided along front surface 662 and has at least one blind-hole bolt passage 668. A ledge 670 extends normally from rear surface 664 and has first and second vertical pin passages 672, 674. A cutter blade 676 is secured to blade holder 640 by a bolt 677 threaded into passage 668 to secure blade 676 in notch 666. Blade 676 extends through longitudinal slot 680 in upper wall 500 of housing 80 when carriage 566 is mounted in chamber 82 on guide bars 504, 508. Chain or drive means 555 is mounted about sprockets 550 and 552 in chamber 82 and is shown as a roller chain. Chain 555 is secured in position by securing the chain end links 557, 559 in FIG. 4 with a connecting link or pins to secure the links to ledge 670 at passages 672 and 674. Thus, a continuous drive chain is formed in housing 80 to drive the cutter carriage 566 and cutter blade 676. Housing 80 is sealed at ends 516, 518 by frame panels 18, 20 secured to ports 98 by securing means 102.

In the operation of assembly 10, cutter blade 676 is utilized to cut a belt end, which task is generally performed to square the belt end for receipt of belt end fasteners 350 to be secured by the roller lacer 12. The belt 352 may be pre-marked for cutting prior to its introduction to the roller lacer machine 10, and then clamped between clamping assembly 14 and cutter housing 16 by second channel member 436 with the cutter blade 676 at one of ends 516, 518 of housing 80. Second channel 436 is moved to engage a belt by rotating handles 488 from the reference position in the direction of the arrows in FIG. 9 to a vertical or belt-engaging position. Cutter blade 676 is moved in housing 80 by mating handle 590 with one of drive shaft ends 604 through portals 420, 422 and passages 570, 568, respectively, and then rotating the handle and drive shafts in drive block assemblies 540, 542 to move the drive means 555 and thus blade carriage 556. Rotation of shafts 544, 546 moves the blade 676 to traverse the length of cutter housing 80 in longitudinal slot 680, to cut the belt end secured between clamp assembly 14 and cutter housing 80. The belt width may be greater than the length of the cutter assembly and impliedly will extend beyond end panels 18, 20. Thus the belt will be wider than the travel of the knife blade 676, which requires a second or continuing cut. In these cases, handle 590 is disengaged from the drive shaft, the clamp 14 is released after a first cut and the belt is again moved into position between clamp 14 and cutter assembly 16 to proceed with a second or multiple cuts of the belt end.

After completion of the belt cutting or belt end squaring operation, the belt end is moved into position in proximity to the roller lacer assembly 12, and more particularly in proximity to the lacing clamp assembly 48. A sleeve or a plurality of belt end fasteners 17 (cf. FIG. 16) are inserted into the comb of the lacing clamp assembly 48, with the rubber grommet or bar 376 contacting the back side of this sleeve or plurality of fasteners. The illustrated fasteners 17 are of the C-clamp or staple-end type fastener with hook ends for insertion into a belt end, and generally having a U-shaped, rear hinge loop 17b joining the upper and lower arms of these fasteners, as illustrated in FIG. 16. Lock handle assembly 50 is rotated and tubular member 360 contacts and biases lacing clamp assembly 48 to abut the fastener loops to push the belt fasteners to the right, as viewed in these FIGS. to abut the belt stops 17a on the fasteners against the belt end, for clinching into the belt end by rollers 44 and 46. A gauge pin is inserted to the aligned hinge loops 17c and the paper carding is removed. Thus, the belt fasteners are secured in position against the belt end, and the belt is secured between clamp assembly 14 and cutter blade housing 16 prior to moving of the rollers 44, 46 to drive the fastener ends into the belt end.

The lacing operation will be described as in one pass or stroke of the roller lacer 12 and rollers 44, 46 along extrusion guide 48 will be utilized to describe the lacing operation. However, it is recognized that an accepted practice is to provide multiple passes of rollers 44, 46 across the ends of the belt fasteners, so that the ends of the fasteners of FIG. 16 are gradually driven into the belt end. Multiple roller passes avoids potential bending and deformation of the fastener ends in the belt or during the securing and clinching operation. Thus, rollers 44, 46 are rolled over or passed across the fastener ends, at approximately the midpoint of the width 327 of rollers 44, 46, to gradually force the fasteners into the belt thickness. After each pass or traverse of the fasteners and belt end, the roller separation distance or gap 282 is narrowed by rotation of knob 280. Thereafter, a second or subsequent number of passes are made across the fastener ends to further drive them into the belt. The number of passes and the amount of narrowing of gap 280 after each pass is dependent upon the user, the belt thickness, the type of fastener and the fastener size. The continuous traversal of rollers 44 and 46 across the fasteners and belt end continues until the fasteners are completely driven into the belt end, and more particularly, until the rollers are in contact with or in very close proximity to the belt surface. The precise separation between the rollers at the conclusion of the clinching operation is, in fact, the prerogative of the user.

The roller lacer 12 is easily moved during the initial clinching operations, that is during the initial driving of the fastener ends into the belt end and it may even be moved by hand without using handle 590. However, subsequent belt end traverses become progressively more difficult as the belt resists penetration by the fastener points and thus handle 590 is utilized on sprocket drive shaft 42 to move the roller lacer assembly along the belt end during fastener clinching. After completion of the clinching operation, the clamp assembly is loosened and the belt end with the attached fasteners is removed. The roller gap 282 is opened to again provide for the next belt end by counter rotation of knob 280.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. A belt lacer assembly for cutting and clinching belt lacing elements to a belt end, said assembly comprising:
   a frame means;
   clamping means for clamping a belt to the frame means;
   cutting means mounted on the frame means to cut the belt while it is clamped by the clamping means to the frame means,
   means on the frame means for holding a plurality of belt lacing elements;
   pressing means for inserting the belt lacing elements for clinching said belt lacing elements to said belt end;
   said clamping means clamping the belt end to the frame means while the pressing means presses the belt lacing elements to clinch them to the belt at predetermined locations on the belt end.

2. A belt lacer assembly in accordance with claim 1 in which the cutting means includes a carriage and a first drive means for driving the carriage to reciprocate the cutting means across the belt end.

3. A belt lacer assembly in accordance with claim 2 in which the pressing means includes a carriage and a second drive means for reciprocating the carriage across the belt lacing elements, said pressing means including rollers for pressing the ends of the belt lacing elements into the belt and for clinching the belt lacing elements to the belt, 4. A belt lacer assembly in accordance with claim 3 including detachable manual operator for attachment to either the first or the second drive means to reciprocate either the cutting means or the roller means.

5. A belt lacer assembly in accordance with claim 4 in which each of the first and second drive means have driving connection means at opposite ends of the frame means so that the detachable manual operator may be shifted after detachment between the opposite ends of the frame means.

6. A belt lacer assembly in accordance with claim 5 in which the frame means has a slot to allow the belt to be slid into position for clinching,
said roller means including upper and lower rollers spaced from each other by a space which is aligned with the slot,
said drive connections for the cutting means being below the plane of the belt end so that the belt end may be placed in the slot and space and extend beyond one side of the assembly while said manual operator is used at the other side of the frame means to drive the cutting means.

7. A belt lacer assembly as claimed in claim 1 wherein said frame means has a first side panel and a second side panel;
said means for clamping, said means for cutting, said means for holding belt-lacing elements and said means for clinching secured and operable between said first and second side panels;
said first side panel defining a first carrying handle and a first belt-receiving notch, and said second side panel defining a second carrying handle and a second belt-receiving notch;
said means for clamping and said means for cutting defining therebetween which gap and said first and second notches are aligned to receive said belt end.

8. A belt lacer assembly as claimed in claim 7 wherein said means for clamping has a first housing channel with a chamber, a lower face, an upper wall and at least two portals in said upper wall;
a clamping member mounted in said housing chamber;
means for operating said clamping member, which means extend through said portals and are coupled to said clamping member;
said clamping member movable from said channel chamber by said operating means to engage and secure a belt in said gap to said cutter blade housing.

9. A belt lacer assembly as claimed in claim 7 wherein said means for clinching is a roller lacer having a roller lacer housing with a drive means, and at least a first and second adjustable roller with a roller gap therebetween;
said housing having at least one sidewall and defining a cavity and a notch in said sidewall open to said cavity;
means for adjusting said rollers;
roller lacer means for driving, which drive means has a roller drive shaft and a sprocket mounted on said drive shaft;
said adjusting means and driving means positioned in said cavity;
said roller lacer housing mounted on and operable along said guide extrusion with said sprocket extending into said notch to contact said guide extrusion roller chain;
said roller drive shaft extending from said housing and rotatable to drive said roller lacer along said guide extrusion.

10. A belt lacer assembly as claimed in claim 9 wherein said first and second rollers are mounted on a first roller shaft and a second roller shaft, respectively;
a first crimp block assembly and a second crimp block assembly mounted and pivotable in said housing cavity;
means for crimp adjusting, which crimp adjusting means operably contacts said first and second crimp block assembly operable to simultaneously pivot said first and second crimp blocks to vary said roller gap distance.

11. A belt lacer assembly as claimed in claim 1 wherein said frame means comprises a first side panel, a second side panel, and a base member with an extending support;
said means for cutting having a cutting blade housing, a cutting blade and means for driving said cutting blade;
said cutting blade housing having a wall with an outer surface and, defining an enclosure and longitudinal slot in said wall,
structural means for coupling said housing with said base member extending support;
said cutting blade and driving means mounted and operable in said enclosure, which cutting blade extends through said slot and movable by said driving means to cut said belt end.

12. A belt lacer assembly as claimed in claim 11 wherein said means for cutting further comprises;
a cutter block assembly having a carriage and a blade holder, which cutter block assembly is positioned and operable in said enclosure;
said cutting blade mounted on said blade holder and extending through said longitudinal slot;
said cutting blade housing having a first end and a second end;
said means for driving having a first drive assembly and a second drive assembly,
said first drive assembly mounted and operable in said enclosure at one of said first and second housing ends, and said second drive assembly mounted and operable in said enclosure at the other of said first and second housing ends;
means for connecting said carriage with said first and second drive assembly, which connecting means is operable to move said carriage and cutting blade holder between said first and second housing ends to cut said belt end.

13. A belt lacer assembly as claimed in claim 12 wherein said cutter housing wall has an upper surface with said longitudinal slot therein;
said upper surface defining a first passage at one of said first and second housing ends, and
a second passage at the other of said first and second housing ends;
said first drive assembly having a first drive shaft extending through the other of said first and second passages, which first and second drive shafts are rotatable to move said connecting means and drive said carriage and cutting blade holder between said first and second housing ends.

14. A belt lacer assembly as claimed in claim 13, further comprising a first guide bar and a second guide bar for said cutter block assembly;

each of said first and second guide bars having a plurality of securing ports;

means for securing said guide bars to said housing;

said cutter blade housing having a first sidewall and a second sidewall, each of said first and second sidewalls having a plurality of through-bores alignable with said guide bar securing ports;

one of said first and second guide bars mounted in said enclosure on said first sidewall;

the other of said first and second guide bars mounted in said enclosure on said second sidewall, said first and second guide bars mounted approximately in parallel and secured to said first and second sidewalls by securing means extending through said aligned sidewall through-bores and guide bar securing ports;

said cutting blade carriage having a front side and a back side;

at least one upper roller and one lower roller for each of said carriage front side and said back side, which upper and lower rollers and respectively mounted and operable on said front side and back side above and below said guide bars;

said cutter block assembly operable along said guide bars on said rollers in said enclosure between said first and second drive assemblies.

15. A belt lacer assembly as claimed in claim 14 wherein said carriage defines a front groove and a back groove in said carriage front side and back side, respectively, which front and back grooves are parallel to said first and second guide bars;

a first bearing mounted in one of said front and back grooves;

a second bearing mounted in the other of said front and back grooves;

said bearings operable to provide a contact surface between said carriage and said guide bars.

16. A belt lacer assembly as claimed in claim 15 further comprising a bolt means, which bolt means is operable to secure said cutter blade to said carriage assembly;

said cutter blade housing defining a first repair notch at said front wall first end and a second repair notch at said front wall second end wherein said cutter blade bolt is accessible for removal of said bolt for cutter blade repair and replacement.

17. A belt lacer assembly as claimed in claim 15 wherein for holding said plurality of lacing elements comprises a guide housing, means for aligning and pushing the belt fasteners, and means for engaging operable to move said pushing means;

said guide housing having a front end, a second end, an upper wall with a first depression, a lower wall with a second depression and a rear wall, which walls cooperate to define a trough through said guide housing to receive said means for engaging and means for pushing;

said rear wall having an outer surface, a first sill and a second sill mounted on an extending from said rear-wall outer surface, which first and second sills cooperate to define a slot therebetween;

a second roller chain segment positioned in said guide housing slot and secured at said guide housing ends;

said means for engaging and means for pushing and fastening mounted and operable in said trough;

an actuating handle with a tubular member extending through said trough between said means for engaging and said rear wall;

said plurality of fasteners positionable and retainable in said trough in proximity to said means for pushing, said tubular member rotatable in said trough to contact and move said engaging means and pushing means to move said fasteners against said belt end.

18. A belt lacer assembly as claimed in claim 14 further comprising a sprocket for each of said first and second drive assembly drive shafts;

said cutter blade holder having a ledge extending therefrom with a first ledge through-bore and a second ledge through-bore;

said means for connecting is a roller chained with a first end and a second end, said roller chain extending around said first and second drive assembly sprockets; and, means for coupling said roller chain and cutter blade holder at said ledge, which coupling means is nested in said first and second ledge throughbores to secure said roller chain ends.

19. A belt lacer assembly as claimed in claim 18 wherein said cutting blade housing has an upper slot and a lower slot on each of said first and second housing sidewalls at one of said first and second housing ends;

each of said first and second drive assemblies having a mounting block with a front face and a rear face, which front and rear faces have an upper securing aperture and a lower securing aperture;

one of said first and second drive assemblies positioned at said housing end with said slots and the other of said first and second drive assemblies mounted at the other of said housing first and second ends;

said one-drive-assembly securing apertures alignable with said housing and slots, which one drive assembly is slidable to adjust said roller chain; and second means for securing extending through said upper and lower slots to mate with said one drive assembly aperture to secure said one drive assembly to said housing at said adjusted position.

20. A belt lacer assembly for cutting and clinching belt lacing elements to a belt end, said assembly comprising:

a frame means;

clamping means for clamping a belt to the frame means;

cutting means mounted on the frame means to cut the belt while it is clamped by the clamping means to the frame means, means on the frame means for holding a plurality of belt lacing elements;

pressing means for inserting the belt lacing elements for clinching said belt lacing elements to said belt end;

said cutting means including:

a tubular housing having four spaced sidewalls interconnected at adjoining corner to define a tube, a cutter carriage mounted for travel within the tube and having a blade to cut the belt, a drive means mounted in the tube and connected to the cutter carriage to reciprocate the cutter carriage and the blade to cut the belt, slide means for guiding the cutter carriage in its reciprocation and having slide surfaces for sliding contact with the carriage, said cutting means being assembled exteriorly of the tube and positioned in the tube, and measured with respect to the distance between it and a pair of opposite sidewalls of the tube, and shim means positioned between at least one sidewall of the tube and the cutter means to take up space previously measured so that the cutting means is positioned to be engaged by and supported by the opposite sidewalls of the tube.

* * * * *

UNITED STATES PATENT AND TRADEMARK OFFICE
CERTIFICATE OF CORRECTION

PATENT NO. : 5,020,209
DATED : June 4, 1991
INVENTOR(S) : Brian W. Fullard

It is certified that error appears in the above-identified patent and that said Letters Patent is hereby corrected as shown below:

On the Title page next to the second inventor's name, change "Beeher" to --Beecher--.

Column 2, Line 30, change "With" to --with--.

Column 4, Line 8, change "claim" to --clamp--.

Column 4, Line 49, change "i" to --in--.

Column 4, Line 67, change "sockets" to --sprockets--.

Column 5, Line 3, after "places" insert --it--.

Column 5, Line 11, change "visa" to --vice--.

Column 6, Line 53, after "132" insert a period.

Column 9, Line 12, change ";" (semicolon) to --,-- (comma).

Column 10, Line 55, change "667" to --677--.

Column 11, Line 3, change "face" to --faces--.

Column 11, Line 42, delete "." (period)

Column 12, Line 13, after "provide" insert --a--.

UNITED STATES PATENT AND TRADEMARK OFFICE
CERTIFICATE OF CORRECTION

PATENT NO. : 5,020,209

DATED : June 4, 1991

INVENTOR(S) : Brian W. Fullard

It is certified that error appears in the above-identified patent and that said Letters Patent is hereby corrected as shown below:

IN THE CLAIMS:

Column 14, Line 68, change "," (comma) to --.-- (period).

Column 15, Line 36, after "defining" insert --a gap--.

Column 16, Line 61, after "through" insert --one of said first and second passages,--.

Column 16, Line 61, after "passages," insert the paragraph --said second drive assembly having a second drive shaft extending through--.

Column 17, Line 48, delete "for".

Column 17, Line 60, change "an" to --and--.

Column 18, Line 60, change "corner" to --corners--.

Signed and Sealed this

Twenty-fourth Day of November, 1992

Attest:

DOUGLAS B. COMER

*Attesting Officer*   Acting Commissioner of Patents and Trademarks